US011483371B2

(12) United States Patent
Jaiswal et al.

(10) Patent No.: US 11,483,371 B2
(45) Date of Patent: Oct. 25, 2022

(54) USER-DERIVED WEBPAGE ACTIVITY CONTROL

(71) Applicant: International Business Machines Corporation, Armonk, NY (US)

(72) Inventors: Peeyush Jaiswal, Boca Raton, FL (US); Shikhar Kwatra, San Jose, CA (US); Priyansh Jaiswal, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/100,992

(22) Filed: Nov. 23, 2020

(65) Prior Publication Data

US 2022/0166825 A1 May 26, 2022

(51) Int. Cl.
*H04L 67/02* (2022.01)
*G06N 3/08* (2006.01)

(52) U.S. Cl.
CPC .............. *H04L 67/02* (2013.01); *G06N 3/08* (2013.01)

(58) Field of Classification Search
CPC .. G06F 16/972; G06F 3/0481; G06F 3/04812; G06F 3/04817; G06F 3/0482; G06F 3/04842; G06F 3/0489; G06F 40/154; G06F 40/166; G06F 16/904; G06F 16/954; G06Q 30/0251; G06Q 30/0271; H04L 67/02; G06N 3/08
See application file for complete search history.

(56) References Cited

U.S. PATENT DOCUMENTS

| | | | |
|---|---|---|---|
| 7,299,409 B2 | 11/2007 | Joshi | |
| 9,317,616 B1* | 4/2016 | Yates | H04L 67/142 |
| 9,612,715 B2* | 4/2017 | Gambhir | G06F 3/0481 |
| 9,767,082 B2 | 9/2017 | Mao | |
| 9,860,334 B2 | 1/2018 | Kuperman | |
| 10,582,001 B2 | 3/2020 | Straub | |
| 2004/0128614 A1* | 7/2004 | Andrews | G06F 40/58 |
| | | | 715/205 |
| 2007/0214239 A1* | 9/2007 | Mechkov | G06F 16/958 |
| | | | 709/219 |
| 2008/0320050 A1 | 12/2008 | Chan | |
| 2011/0320964 A1* | 12/2011 | Gambhir | G06F 3/04817 |
| | | | 715/861 |
| 2013/0124971 A1 | 5/2013 | Bockus, Jr. | |
| 2014/0130182 A1* | 5/2014 | Yackanich | G06Q 30/0251 |
| | | | 726/27 |
| 2014/0143649 A1* | 5/2014 | Bridgen | G06F 16/9574 |
| | | | 715/234 |
| 2014/0298159 A1* | 10/2014 | Kim | G06F 40/143 |
| | | | 715/234 |

(Continued)

*Primary Examiner* — Ninos Donabed
(74) *Attorney, Agent, or Firm* — Randy Tejeda (57) ABSTRACT

One or more computer processors compile a list of asynchronous web calls associated with a retrieved webpage. The one or more computer processors map each asynchronous web call in the list of asynchronous web calls with one or more respective HTML snippets. The one or more computer processors identify content associated with the one or more mapped HTML snippets. The one or more computer processors dynamically suspend one or more asynchronous web calls utilizing a trained model and the identified content, wherein suspending the web call prevents the web call from modifying the retrieved webpage.

14 Claims, 4 Drawing Sheets

(56) References Cited

U.S. PATENT DOCUMENTS

| | | |
|---|---|---|
| 2015/0186342 A1 | 7/2015 | Tripp |
| 2016/0182537 A1* | 6/2016 | Tatourian .............. H04L 63/145 726/23 |
| 2018/0157501 A1* | 6/2018 | Tuli ...................... G06F 40/154 |
| 2018/0241881 A1* | 8/2018 | Li ........................ G06Q 30/016 |

* cited by examiner

USER-DERIVED WEBPAGE ACTIVITY CONTROL

BACKGROUND

The present invention relates generally to the field of web browsing, and more particularly to dynamic browsing management.

Asynchronous web programming is a set of web development techniques using many web technologies on the client side to create asynchronous web applications. With synchronous web programming, web applications can send and retrieve data from a server asynchronously (in the background) without interfering with the display and behavior of the existing page. By decoupling the data interchange layer from the presentation layer, asynchronous web programming allows web pages and, by extension, web applications, to change content dynamically without the need to reload the entire page. The webpage can then be modified to dynamically display, and allow the user to interact with, the new information.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of artificial neural network where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRU) are a gating mechanism in recurrent neural networks. GRU performance on polyphonic music modeling and speech signal modeling was found to be similar to LSTM. However, GRUs exhibit better performance on smaller datasets. LSTMs can be bidirectional (BLSTM) consisting of two LSTM networks where each contained layer is unrolled forward and backward in time.

SUMMARY

Embodiments of the present invention disclose a computer-implemented method, a computer program product, and a system. The computer-implemented method includes one or more computer processers compiling a list of asynchronous web calls associated with a retrieved webpage. The one or more computer processors map each asynchronous web call in the list of asynchronous web calls with one or more respective HTML snippets. The one or more computer processors identify content associated with the one or more mapped HTML snippets. The one or more computer processors dynamically suspend one or more asynchronous web calls utilizing a trained model and the identified content, wherein suspending the web call prevents the web call from modifying the retrieved webpage.

BRIEF DESCRIPTION OF THE DRAWINGS

FIG. (i.e., FIG.) 1 is a functional block diagram illustrating a computational environment, in accordance with an embodiment of the present invention.

DETAILED DESCRIPTION

As internet technology continues to develop utilizing dynamic paradigms, the ability for a user to lose content substantially increases. Currently, as users are viewing a webpage, there may be some portions of the webpage which are reloaded behind-the-scenes at given time intervals (e.g., asynchronous). Users may lose the ability to view and interact with content that was removed due to an asynchronous web call. These dynamic web calls allow the webpage to show updated material to the viewer, however, this might be contrary to user intentions.

Embodiments of the present invention dynamically maintain all or a subset of one or more sections of the displayed current content based on a trained model. Some embodiments of the present invention recognize that browsing is improved by dynamically controlling content utilizing the trained model specific to a user. Embodiments of the present invention create a model specific to the interests of a user by training the model with historical web calls selections, created user profile, identified topics, compiled web calls, and associated content. Embodiments of the present invention allow a user to select and suspend web calls associated with displayed dynamic content. Embodiments of the present invention identify content related to one or more identified web calls contained in a requested webpage. Implementation of embodiments of the invention may take a variety of forms, and exemplary implementation details are discussed subsequently with reference to the Figures.

The present invention will now be described in detail with reference to the Figures.

Figure 1:
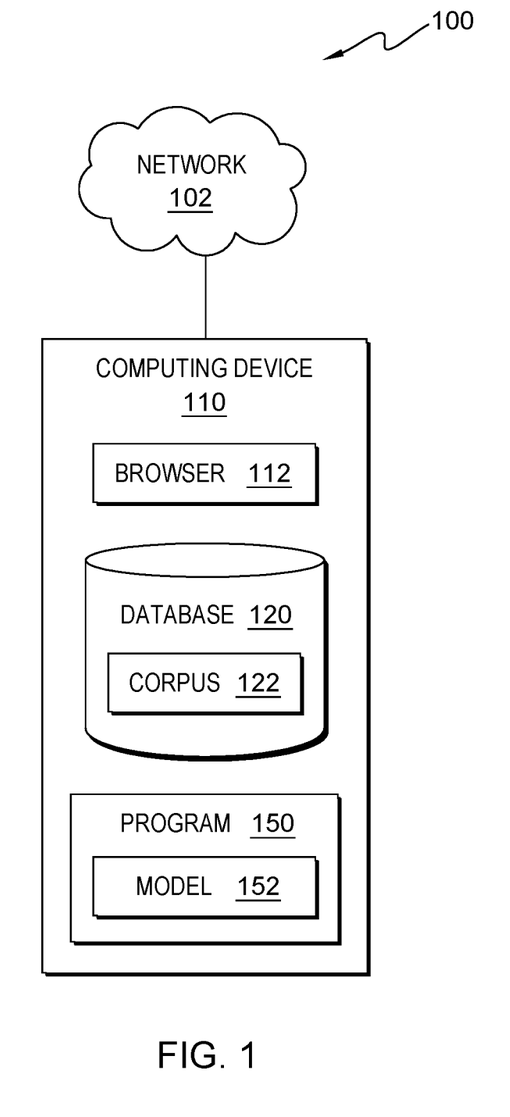

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 can be a standalone computing device, a management server, a web server, a mobile computing device, or any other electronic device or computing system capable of receiving, sending, and processing data. In another embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In the depicted embodiment, computing device 110 includes browser 112, database 120, and program 150. In other embodiments, computing device 110 may contain other applications, databases, programs, etc. which have not been depicted in computational environment 100. Computing device 110 may include internal and external hardware components, as depicted and described in further detail with respect to FIG. 4.

Browser 112 is a software application for accessing information on the World Wide Web. When a user requests a web page from a particular web site, browser 112 retrieves the necessary content from a web server and then displays the page on computing device 110. In an embodiment, browser 112 implements and application programming interface (API) allowing program 150 to access networking related functionality.

Database 120 is a repository for data used by program 150. In the depicted embodiment, database 120 resides on computing device 110. In another embodiment, database 120 may reside elsewhere within computational environment 100 provided program 150 has access to database 120. A database is an organized collection of data. Database 120 can be implemented with any type of storage device capable of storing data and configuration files that can be accessed and utilized by program 150, such as a database server, a hard disk drive, or a flash memory. In an embodiment, database 120 stores data used by program 150, such as user profiles, user posts, and social media accounts. In another embodiment, database 120 stores historical user selections.

Corpus 122 contains one or more examples, sets of training data, data structures, and/or variables used to fit the parameters of model 152. In an embodiment, the contained training data comprises of pairs of input vectors (e.g., text and/or image) with associated output vectors (e.g., predicted interest or interest probability). In an embodiment, corpus 122 may contain one or more sets of one or more instances of unclassified or classified (e.g., labelled) data, hereinafter referred to as training statements. In another embodiment, training data contains an array of training statements organized in labelled training sets. In an embodiment, each training set includes a label and an associated array or set of training statements which can be utilized to train one or more models. For example, a plurality of training sets may include training statements containing webpages comprising web code (HTML, CSS, JavaScript, etc.) as paired with associated user parameters. In an embodiment, corpus 122 contains unprocessed training data. In various embodiments, corpus 122 contains vectorized (i.e., one-hot encoding, word embedded, dimension reduced, etc.) training sets, associated training statements, and labels.

Program 150 is a program for dynamic suspension of web content. In various embodiments, program 150 may implement the following steps: compiling, by one or more computer processors, a list of asynchronous web calls associated with a retrieved webpage; mapping each asynchronous web call in the list of asynchronous web calls with one or more respective HTML snippets; identifying content associated with the one or more mapped HTML snippets; and dynamically suspending one or more asynchronous web calls utilizing a trained model and the identified content, wherein suspending the web call prevents the web call from modifying the retrieved webpage. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a LSTM trained utilizing supervised training methods. In an embodiment, model 152 assesses identified content extracted from a HTML associated with a web call (e.g., words, sentences, phrases, paragraphs, sections, etc.) by considering different features, available as structured or unstructured data, and applying relative numerical weights. In this embodiment, program 150 learns and maintain a user specific content pattern history or sequence of associated web calls that the user would suspend and/or prevent dynamically reloading in the absence of action from the user. The training of model 152 is depicted and described in further detail with respect to FIG. 2.

The present invention may contain various accessible data sources, such as database 120 and corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
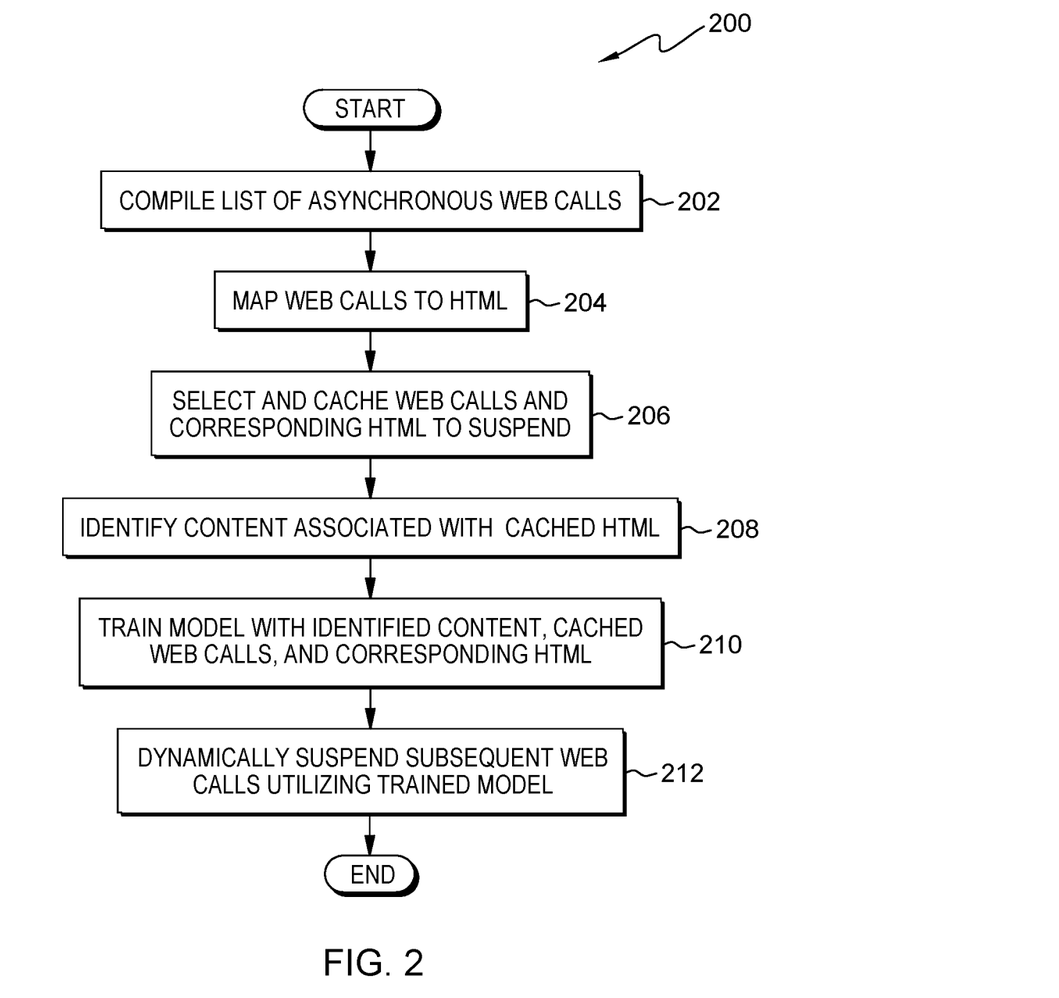
FIG. 2 is a flowchart depicting operational steps of a program, on a computing device within the computational environment of FIG. 1, for dynamic suspension of web content, in accordance with an embodiment of the present invention.

FIG. 2 depicts flowchart 200 illustrating operational steps of program 150 for dynamic suspension of web content, in accordance with an embodiment of the present invention.

Program 150 compiles a list of asynchronous web calls (step 202). In an embodiment, program 150 initiates responsive to a user requested webpage utilizing browser 112, where the requested (e.g., current) webpage comprises a plurality of web calls (e.g., synchronous and asynchronous), stylistic elements (i.e., cascading style sheets (CSS)), and HTML, snippets. For example, a user utilizes browser 112 to retrieve and display a news webpage. In another embodiment, program 150 initiates in response to a provided uniform resource link (URL). In an embodiment, program 150 utilizes a web crawler to analyze a set of URLs and corresponding webpages. In an embodiment, program 150 maintains a snapshot of each retrieved webpage. In these embodiments, program 150 abides by a plurality of procedures for web crawling as dictated by the webpage and an associated robots.txt. In another embodiment, program 150 monitors browser 112 to determine a network transfer (e.g., hypertext transfer protocol (HTTP requests, etc.)). In an embodiment, program 150 identifies a HTTP request and pauses, delays, suspends, or halts the request or the presentation of the request until program 150 has analyzed said web calls, as detailed below in step 212. In yet another embodiment, program 150 may analyze traffic of client computing device 110 to detect a communication of a request. In yet another embodiment, program 150 detects a URL by detecting a user entering characters in browser 112. In an embodiment, program 150 initiates responsive to one or more web calls attempting to modify the retrieved webpage.

Program 150 compiles a list of all asynchronous web calls associated with a retrieved webpage. In an embodiment, program 150 compiles the list of all asynchronous web calls by utilizing an application programming interface (API) associated with browser 112. In another embodiment, program 150 utilizes network analysis capabilities associated with browser 112 to determine all web calls comprised in a webpage. In an embodiment, program 150 acts as an inline proxy and/or a transparent proxy 'sitting' in between the computing device and one or more subsequent computing devices, nodes, destination networks, and/or servers. In this embodiment, all browser related network traffic will route (e.g., travel, transmit, etc.) through program 150. In an embodiment, program 150 utilizes a network monitor associated with browser 112 to snapshot network traffic associated with a current webpage. This embodiment allows program 150 to identify and analyze persistent network requests. In various embodiments, program 150 identifies and records a plurality of metadata associated with the current webpage such as status (e.g., hypertext transfer protocol (HTTP)), transmission method, domain, request filename, uniform resource link (URL), protocol, remote internet protocol, response type, and resource size. In another embodiment, program 150 identifies web calls that are asynchronous (e.g., dynamic), where the asynchronous web calls can change web content without user action (e.g., user directed webpage reload).

Program 150 maps the compiled web calls to HTML (step 204). Program 150 maps one or more compiled web calls to one or more HTML snippets contained in the retrieved webpage. In an embodiment, program 150 utilizes HTML analysis capabilities of browser 112 to determine which web call corresponds to one or more HTML snippets. In an additional embodiment, program 150 determines the location of the one or more mapped HTML snippets on the webpage. In an embodiment, program 150 creates a hierarchical graph of all web calls with respective mapped HTML snippets. In another embodiment, program 150 maps the web calls to HTML by crawling the webpage continuously for a period and then comparing each crawled version of the webpage. In this embodiment, program 150 determines if a web call is asynchronous and whether the web call is scheduled to a particular period by comparing changed elements on the same webpage but at different time intervals. For example, program 150 determines that a webpage updates all headlines every 45 minutes by continuously crawling the webpage and comparing each crawled instance.

Program 150 selects and caches the compiled web calls and mapped HTML to suspend (step 206). In an embodiment, program 150 creates and displays a graphical table containing compiled web calls and mapped HTML. In this embodiment, program 150 notifies the user to one or more web calls that have the possibility of altering one or more webpage contents without user action (e.g., intentionally reloading the page). In another embodiment, program 150 modifies web code associated with the retrieved webpage to highlight sections of HTML that are associated with web calls with a possibility of subsequent alteration. For example, program 150 creates a yellow border around a HTML snippet controlled by an asynchronous web call. In another embodiment, program 150 utilizes historical versions of the current webpage to determine an subsequent alteration score for a web call signifying a likelihood of the web call subsequently updating associated HTML within a temporal period (e.g., within 5 minutes, etc.). For example, program 150 assigns the top headline HTML snippet and associated web call in a daily news webpage a high subsequent alteration score. In a further embodiment, program 150 adjusts HTML associated with web calls based on determined subsequent alteration scores. For example, for a highly dynamic web call with a determined high subsequent alteration score, program 150 presents a large flashing border surrounding the HTML element and bolds text the comprised content. In an yet another embodiment, program 150 adjusts the presentation of a notification based on a determined interest score associated with the content, as described in step 212. In an embodiment, program 150 prompts a user to select one or more web calls to suspend from the presented list of web calls. In this embodiment, program 150 maintains a cache of HTML snippets associated with the selected web calls. In another embodiment, program 150 selects one or more web calls utilizing one or more calculations (e.g., interest values) from model 152 as discussed in step 212.

Program 150 identifies content associated with cached HTML (step 208). In an embodiment, program 150 utilizes one or more HTML analysis capabilities provided by browser 112 to identify content contained in one or more cached HTML snippets. For example, program 150 extracts text (e.g., section headline) contained in a cached paragraph HTML element. In an embodiment, program 150 parses the extracted text utilizing natural language processing (NLP) techniques, such as syntactic analysis to identify parts of speech and syntactic relations between various portions of the extracted text and/or webpage. In a further embodiment, program 150 utilizes part-of-speech tagging to identify the particular part of speech of one or more words in text based on its relationship with adjacent and related words. In an embodiment, program 150 utilizes the aforementioned techniques to determine an associated topic for content contained in a HTML snippet. For example, the user selects a plurality of web calls with associated HTML containing content determined to be associated with cooking topics. In another embodiment, program 150 utilizes a trained region based convolutional neural network (R-CNN) to perform image recognition and region of interest (ROI) capturing on one or more images extracted from cached HTML.

In an embodiment, program 150 creates a user profile containing one or more determined interests for a user. In this embodiment, program 150 registers one or more social network accounts associated with a user including any network where the user shares interests and activities. In this embodiment, program 150 retrieves associated social network information including profiles, liked interests, posts, and comments of the user. In this embodiment, program 150 analyzes social network information using natural language processing techniques (e.g., sentence splitting, tokenization, entity extracting, part-of-speech tagging, chunking, dependency parsing, and anaphora resolution, etc.) to process semantics of the text and determine the interests of the user. In a further embodiment, program 150 includes identified content from user selected HTML and associated content into the user profile.

Program 150 trains a model with the identified content, cached web calls, and corresponding HTML (step 210). In an embodiment, program 150 trains model 152, a LSTM, to learn and maintain a user specific content pattern history or sequence of associated web calls that the user would suspend and/or prevent dynamically reloading in the absence of action from the user. In this embodiment, program 150 utilizes model 152 to calculate an interest value representing a level of user interest for a specified topic. In an embodiment, program 150 utilizes training sets in corpus 124, identified content from step 208, cached web calls, corresponding HTML, and an associated user profile to perform supervised training of model 152. As would be recognized by one skilled in the art, supervised training determines the difference between a prediction and a target (i.e., the error), and back-propagates the difference through the layers such that model 152 learns. In an embodiment, program 150 determines whether a sufficient accuracy is obtained by utilizing test sets and the associated test labels. In another embodiment, program 150 utilizes cross-entropy (e.g., Kullback-Leibler divergence, etc.) as a loss function to determine the level of accuracy of the model. In this embodiment, program 150 compares a predicted interest value with an expected interest value for specified content. In various embodiments, program 150 utilizes model 152 to calculate a probability that the user is interested in identified content given an associated web call. In a further embodiment, program 150 deploys one or more SVM classifiers, utilizing ensemble learning, to determine whether to enable or disable the associated web call based on one or more predictions from model 152.

Program 150 dynamically suspends subsequent web calls utilizing the trained model (step 212). In an embodiment, program 150 suspends one or more user selected or determined web calls, as discussed in step 206, where web call suspension prevents the web call from modifying the webpage without action from the user. In this embodiment, program 150 utilizes an API associated with browser 112 to block the selected web calls. In another embodiment, program 150 blocks network traffic associated with the web call. For example, program 150 allows the content associated with the user selected portions (e.g., HTML associated with selected web calls) of the webpage to remain unchanged, allowing the user to step away from browser 112, without the suspended web call updating information that the user was viewing. In another embodiment, if program 150 is not able (i.e., fails) to suspend or block a web call, then program 150 reverts (i.e., replaces) the updated HTML and the updated content with cached (e.g., original) content. In this embodiment, program 150 caches the updated HTML and content for subsequent utilization and retraining for model 152. In an embodiment, responsive to a trained model 152, as discussed in 210, program 150 subsequently performs steps 202-208 as the user utilizes browser 112. In a further embodiment, responsive to the identification of subsequently identified content, program 150 feeds the identified content into trained model 152 and utilizes the output to dynamically suspend and/or unsuspend one or more associated web calls. This embodiment is further discussed in FIG. 3.

Figure 3:
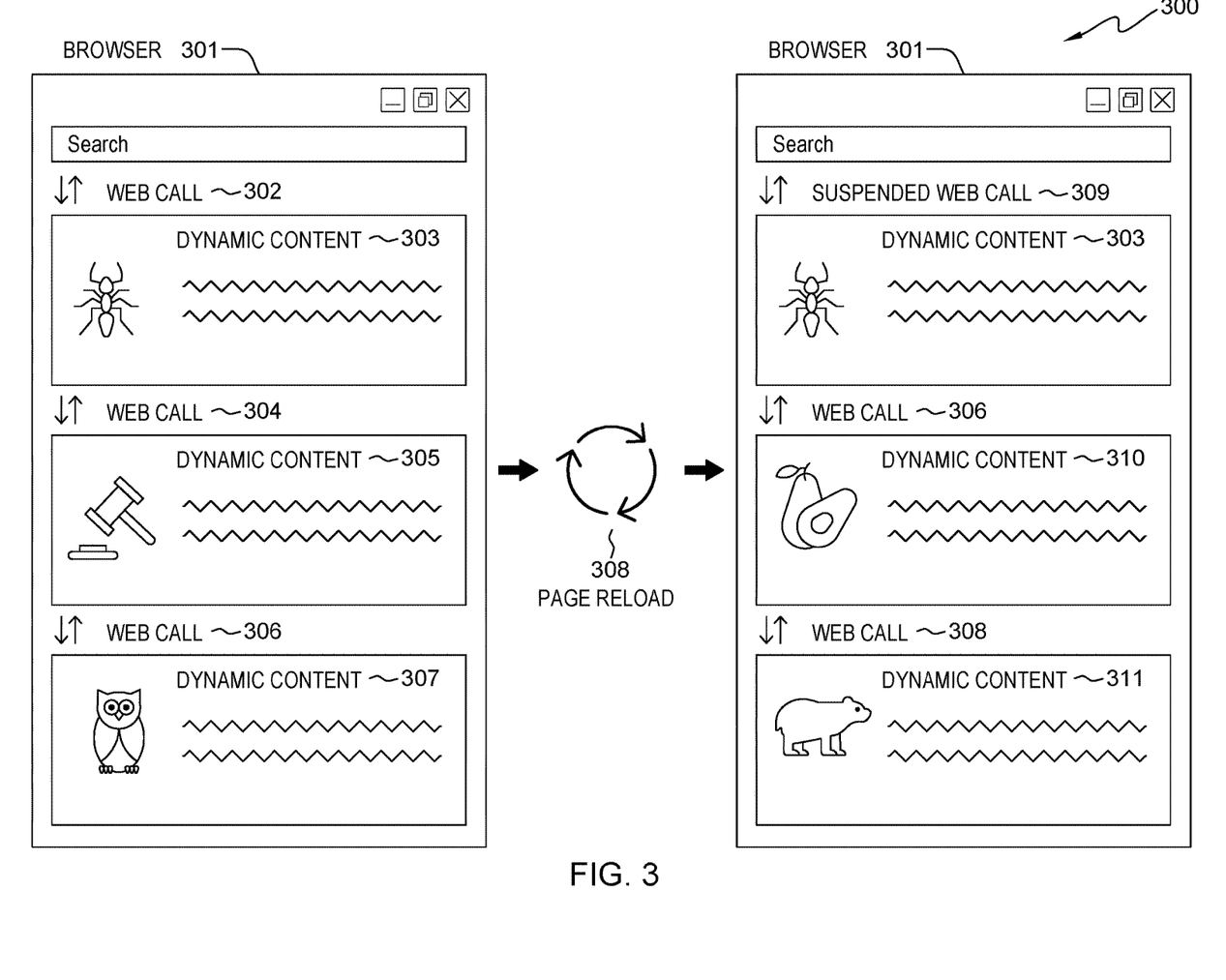
FIG. 3 is an illustration depicting operational steps of a program within the computational environment of FIG. 1, in accordance with an embodiment of the present invention.

FIG. 3 contains illustration 300 depicting operational steps of a program within the computational environment of FIG. 1, in accordance with an embodiment of the present invention. Illustration 300 contains browser 301 retrieving a webpage comprising a plurality of web calls (i.e., web call 302, 304, 306, 308) and associated dynamic content (i.e., dynamic content 303, 305, 307, 310, 311). A user instructs browser 301 to retrieve and display a webpage comprising a plurality of web calls controlling a plurality of dynamic content. As the user browses the interne, program 150 compiles a list containing web call 302, web call 304, and web call 306 contained in the requested webpage. Program 150 then identifies a topic associated with each respective dynamic content and program 150 determines a level of user interest for each topic utilizing a trained model (i.e., model 152). Here, program 150 determines that the user is interested in a topic associated with dynamic content 303 but not dynamic content 305 and 307, and program 150 suspends web call 302. Responsive to a web call reloading (e.g., modifying) the webpage (i.e., page reload 308), program 150 prevents web call 302, now suspended web call 309, from updating dynamic content 303 while allowing web call 304 and web call 306 to update associated dynamic content.

Figure 4:
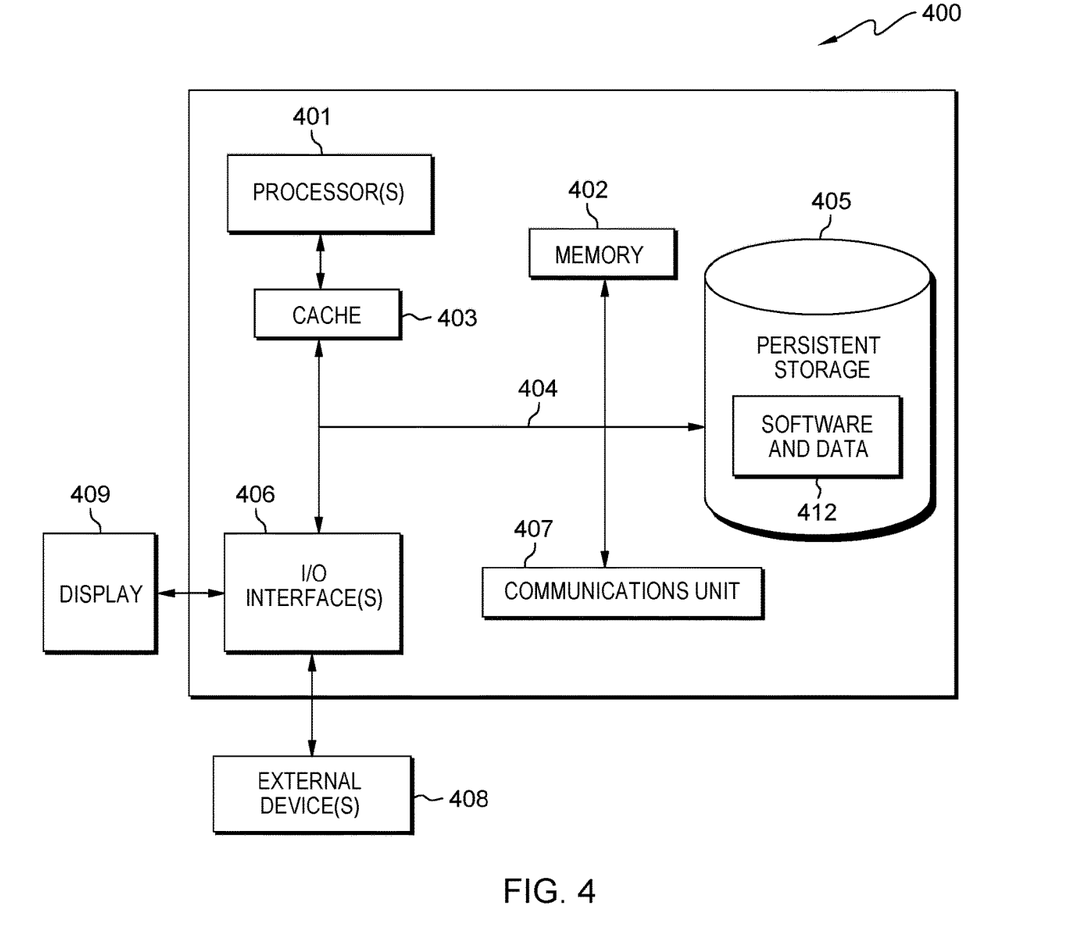
FIG. 4 is a block diagram of components of the computing device, in accordance with an embodiment of the present invention.

FIG. 4 depicts block diagram 400 illustrating components of computing device 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising: compiling, by one or more computer processors, a list of asynchronous web calls associated with a retrieved webpage; mapping, by one or more computer processors, each asynchronous web call in the complied list of asynchronous web calls with one or more respective HTML snippets; calculating, by one or more computer processors, an alteration score for each asynchronous web call in the complied list of asynchronous web calls, wherein the alteration score signifies a likelihood of a respective asynchronous web call subsequently changing associated content within a temporal period based on historical versions of the retrieved webpage; calculating, by one or more computer processors, an interest value for the content associated with one or more asynchronous web calls utilizing a model trained with user specific content pattern history and historically suspended web calls or web calls reloaded in an absence of action from a user, wherein the interest value is a level of user interest for the identified content; and dynamically suspending, by one or more computer processors, one or more asynchronous web calls utilizing respective calculated alteration scores, respective calculated interest values, wherein suspending the web call prevents changing associated content;

wherein the trained model is a LSTM;
wherein the LSTM is trained utilizing the identified content, one or more cached web calls, corresponding HTML, and an associated user profile.

2. The computer-implemented method of claim 1, further comprising:
presenting, by one or more computer processors, the compiled list of asynchronous web calls to a user.

3. The computer-implemented method of claim 2, wherein presenting the compiled list of asynchronous web calls to the user, comprises:
adjusting, by one or more computer processors, web code associated with the retrieved webpage to highlight one or more sections of HTML, associated with one or more web calls based on a calculated interest value.

4. The computer-implemented method of claim 1, wherein content is text or images.

5. The computer-implemented method of claim 1, further comprising:
responsive to a failed web call suspension, replacing, by one or more computer processors, updated content with original content.

6. A computer program product comprising: one or more computer readable storage media and program instructions stored on the one or more computer readable storage media, the stored program instructions comprising: program instructions to compile a list of asynchronous web calls associated with a retrieved webpage; program instructions to map each asynchronous web call in the complied list of asynchronous web calls with one or more respective HTMIL snippets; program instructions to calculate an alteration score for each asynchronous web calls in the complied list of asynchronous web call, wherein the alteration score signifies a likelihood of a respective asynchronous web call subsequently changing associated content within a temporal period based on historical versions of the retrieved webpage; program instructions to calculate an interest value for the content associated with one or more asynchronous web calls utilizing a model trained with user specific content pattern history and historically suspended web calls or web calls reloaded in an absence of action from a user, wherein the interest value is a level of user interest for the identified content; and program instructions to dynamically suspend one or more asynchronous web calls utilizing respective, calculated alteration scores, and respective calculated interest values, wherein suspending the web call prevents changing associated content;
wherein the trained model is a LSTM,
wherein the LSTM is trained utilizing the identified content, one or more cached web calls, corresponding HTML, and an associated user profile.

7. The computer program product of claim 6, wherein the program instructions, stored on the one or more computer readable storage media, further comprise:
program instructions to present the compiled list of asynchronous web calls to a user.

8. The computer program product of claim 7, wherein the program instructions, to present the compiled list of asynchronous web calls to the user, comprise:
program instructions to adjust web code associated with the retrieved webpage to highlight one or more sections of HTML associated with one or more web calls based on a calculated interest value.

9. The computer program product of claim 6, wherein content is text or images.

10. The computer program product of claim 6, wherein the program instructions, stored on the one or more computer readable storage media, further comprise:
program instructions to, responsive to a failed web call suspension, replace updated content with original content.

11. A computer system comprising: one or more computer processors; one or more computer readable storage media; and program instructions stored on the computer readable storage media for execution by at least one of the one or more processors, the stored program instructions comprising: program instructions to compile a list of asynchronous web calls associated with a retrieved webpage; program instructions to map each asynchronous web call in the complied list of asynchronous web calls with one or more respective HTMIL snippets; program instructions to calculate an alteration score for each asynchronous web calls in the complied list of asynchronous web call, wherein the alteration score signifies a likelihood of a respective asynchronous web call subsequently changing associated content within a temporal period based on historical versions of the retrieved webpage; program instructions to calculate an interest value for the content associated with the one or more asynchronous web calls utilizing a model trained with user specific content pattern history and historically suspended web calls or web calls reloaded in an absence of action from a user, wherein the interest value is a level of user interest for the identified content; and program instructions to dynamically suspend one or more asynchronous web calls utilizing respective calculated alteration scores, and respective calculated interest values, wherein suspending the web call prevents changing associated content;
wherein the trained model is a LSTM,
wherein the LSTM is trained utilizing the identified content, one or more cached web calls, corresponding HTML, and an associated user profile.

12. The computer system of claim 11, wherein the program instructions, stored on the one or more computer readable storage media, further comprise:
program instructions to present the compiled list of asynchronous web calls to a user.

13. The computer system of claim 12, wherein the program instructions, to present the compiled list of asynchronous web calls to the user, comprise:
program instructions to adjust web code associated with the retrieved webpage to highlight one or more sections of HTML associated with one or more web calls based on a calculated interest value.

14. The computer system of claim 11, wherein content is text or images.

* * * * *